United States Patent [19]
Kurz

[11] Patent Number: 5,868,440
[45] Date of Patent: Feb. 9, 1999

[54] HOSE CONNECTOR

[75] Inventor: Reinhard Kurz, Nidderau, Germany

[73] Assignee: Renus Armaturen GmbH, Altenstadt, Germany

[21] Appl. No.: 896,860

[22] Filed: Jul. 18, 1997

[30] Foreign Application Priority Data

Aug. 23, 1996 [DE] Germany .......................... 196 34 037.3
Feb. 6, 1997 [EP] European Pat. Off. .............. 97101847

[51] Int. Cl.$^6$ .............................. F16L 37/22; F16L 33/20
[52] U.S. Cl. .......................................... 285/318; 285/249
[58] Field of Search .................................. 285/318, 246, 285/248, 249, 247

[56] References Cited

U.S. PATENT DOCUMENTS

| | | | |
|---|---|---|---|
| 2,846,240 | 8/1958 | Beyer | 285/318 |
| 3,167,331 | 1/1965 | Marshall . | |
| 3,532,101 | 10/1970 | Snyder | 285/318 |
| 4,606,564 | 8/1986 | Kurachi | 285/249 |
| 5,423,578 | 6/1995 | Kanomata et al. | 285/318 |
| 5,727,821 | 3/1998 | Miller | 285/318 |

FOREIGN PATENT DOCUMENTS

| | | | |
|---|---|---|---|
| 215238 | 5/1961 | Australia | 285/249 |
| 591813 | 2/1960 | Canada | 285/249 |
| 1072028 | 12/1959 | Germany . | |
| 18 24 206 | 11/1960 | Germany . | |
| 1095068 | 12/1960 | Germany | 285/249 |
| 296 05 218 | 6/1996 | Germany . | |
| 17133 | of 1909 | United Kingdom | 285/318 |
| 960436 | 6/1964 | United Kingdom . | |

Primary Examiner—Eric K. Nicholson
Attorney, Agent, or Firm—Collard & Roe, P.C.

[57] ABSTRACT

A hose connector comprises (a) a tubular nipple comprising one end insertable into an end of a hose, the one end defining an annular shallow recess of a depth of 0.2 mm to 0.8 mm, the shallow recess being delimited by a flat bottom and two shoulders defining sharp edges and extending substantially perpendicularly to the cylindrical surface of the tubular nipple whereby a linear pressure is exerted upon a hose whereinto the one tubular nipple end is inserted, (b) a collar concentrically surrounding the one tubular nipple end, (c) a sleeve concentrically surrounding the one tubular nipple end and threadedly connected to the collar, the collar and the sleeve defining an annular groove for receiving the hose end, a portion of the internal collar wall frusto-conically diverging towards the sleeve, and an end of the sleeve facing the frusto-conically diverging internal collar wall portion forming an annular abutment, the conically diverging internal collar wall portion and the annular abutment defining an annular chamber, and (d) at least one toroidal coil spring arranged in the annular chamber opposite the annular shallow recess, the annular abutment having an outer diameter that is slightly larger than a median diameter of the coil spring in a radially tensionless state.

14 Claims, 4 Drawing Sheets

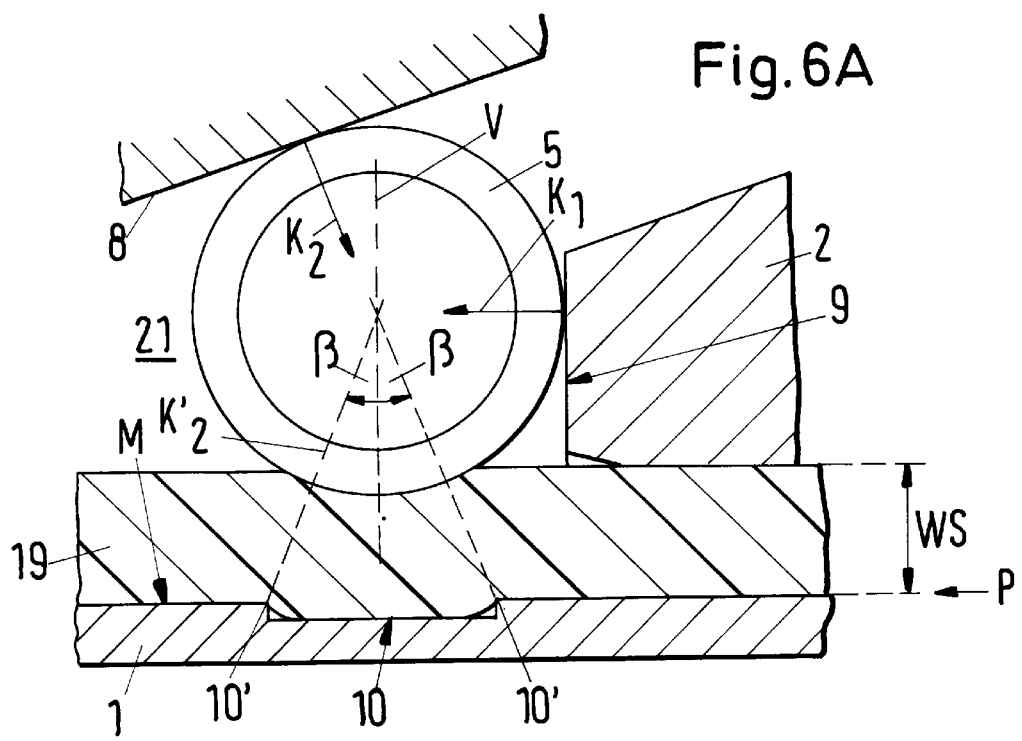
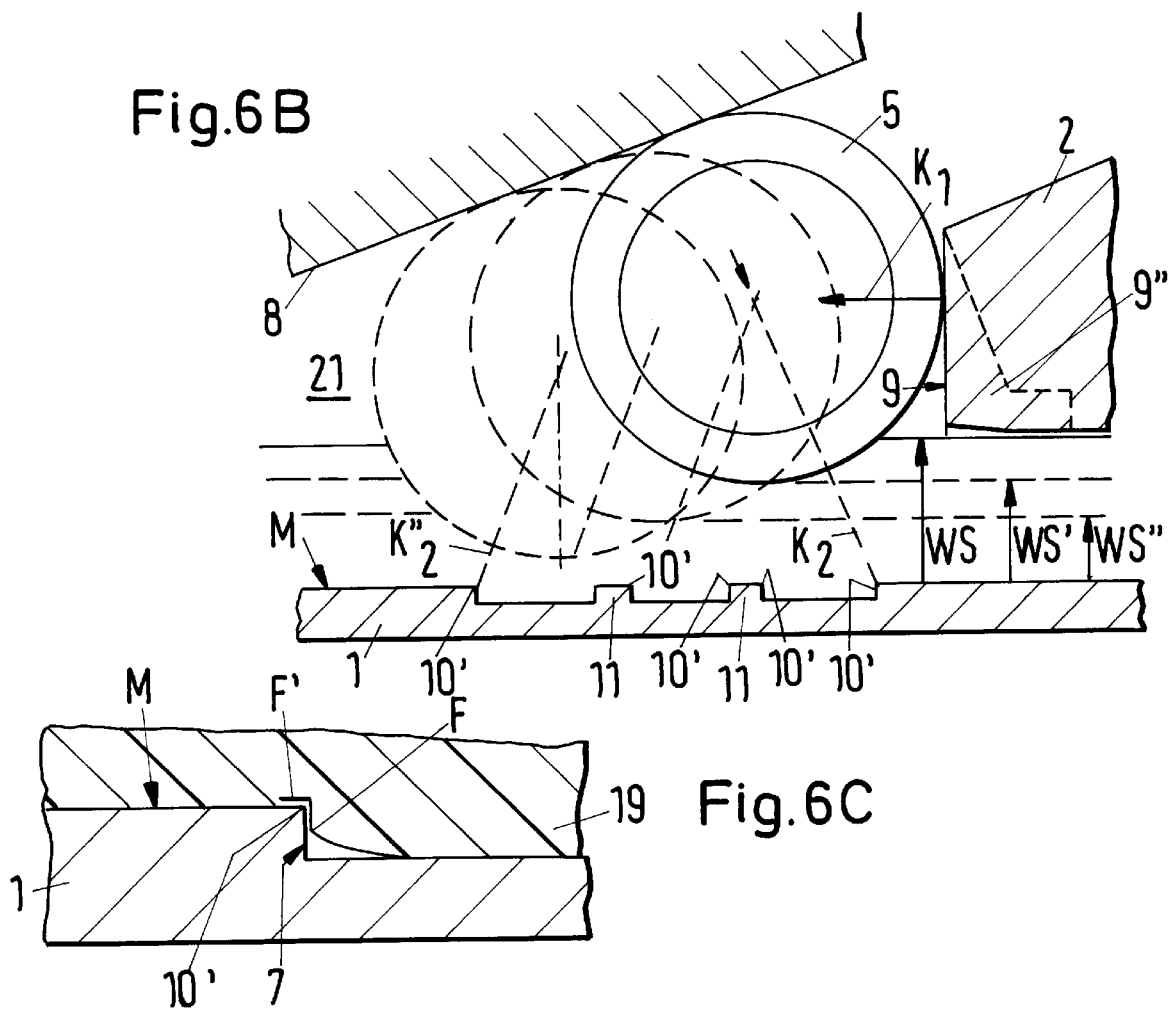

HOSE CONNECTOR

BACKGROUND OF THE INVENTION

1. Field of the Invention

The present invention relates to a hose connector, and in particular to a hose connector specially adapted for use with soft-walled hoses.

2. Description of the Prior Art

Hose connectors for such use have been disclosed, for example, in U.S. Pat. No. 3,167,331, British patent No. 960,436, German patent No. 1,072,028 and German utility models Nos. 18 24 206 and 296 05 218, whose registration dates have been published but which are not printed publications.

In these hose connectors, compression coil springs are bent into an annular shape for use as tensioning elements to form a toroidal coil spring. Common to the enumerated disclosures is the principle that a divergent internal conical wall of a collar surrounding an end of a hose into which a tubular nipple is inserted radially presses the toroidal coil spring arranged between the conical collar wall and the hose end against the hose end and thus firmly holds the hose end on the inserted tubular nipple when a sleeve is threadedly connected to the collar. According to German utility model No. 18 24 206, the tubular nipple end inserted into the hose has shallow grooves delimited by rounded shoulders merging into the smooth circumferential surface of the tubular nipple end. The rounded groove shoulders do not contribute to the fluid-tightness of the connector and are provided apparently to facilitate pulling the hose end, which is under pressure, off the nipple.

Although some of these disclosures go back to the 1950s and 1960s and appear to provide ideal and simple fixing devices, they have not found a commercial market. This may be explained by recent tests (see German utility model No. 296 05 218) showing that the known screwed-together hose connectors are not sufficiently fluid-tight and the hose end cannot be readily pulled off these connectors. In addition, the toroidal coil spring is only radially pressed against the hose end, which means that radial resistance of the hose material is rapidly encountered when the collar and sleeve are screwed together so that it cannot be readily felt whether the end of the hose actually is sufficiently firmly held on the nipple.

In all the hose connectors of this general type, it was apparently assumed that pressing the hose end against the inserted tubular nipple end will automatically assure sufficient fluid-tightness and, at the same time, that orienting the internal conical wall portion of the collar so that it diverges in the direction of pulling the hose end over the nipple end will assure that the toroidal coil spring is ever more firmly wedged against the hose end as it tends to pull off the nipple end, which makes it unnecessary to impart a special profile to the tubular nipple end to prevent a tendency of the hose end to be pulled off the nipple end.

SUMMARY OF THE INVENTION

It is a primary object of this invention to overcome the afore-mentioned problems and deficiencies and to provide a hose connector which securely grips a soft-walled hose and which effectively eliminates leakage as well as slipping or cutting of the hose.

The above and other objects are accomplished in accordance with the invention with a hose connector comprising, in combination: (a) a tubular nipple having a cylindrical surface and comprising one end insertable into an end of a hose, the one end defining a circumferentially extending, annular shallow recess of a depth of 0.2 mm to 0.8 mm, the shallow recess being delimited by a flat bottom and two shoulders defining sharp edges and extending substantially perpendicularly to the cylindrical surface of the tubular nipple whereby a linear pressure is exerted upon a hose whereinto the one tubular nipple end is inserted, and an opposite end forming a connecting part; (b) a collar concentrically surrounding the one tubular nipple end and having an internal wall facing the one tubular nipple end, the opposite tubular nipple end projecting beyond the collar; (c) a sleeve concentrically surrounding the one tubular nipple end and threadedly connected to the collar, the collar and the sleeve defining an annular groove with the circumferential surface of the tubular nipple end for receiving the hose end, a portion of the internal collar wall frusto-conically diverging towards the sleeve, and an end of the sleeve facing the frusto-conically diverging internal collar wall portion forming an annular abutment, the conically diverging internal collar wall portion and the annular abutment defining an annular chamber; and (d) at least one toroidal coil spring arranged in the annular chamber opposite the annular shallow recess, the annular abutment having an outer diameter that is slightly larger than a median diameter of the coil spring in a radially tensionless state.

Such a hose connector enables the hose end to be pushed onto, and pulled off, the one nipple end without difficulty while the diameter of the toroidal coil spring is reduced in a radial direction by its displacement in the direction of the nipple axis. The annular shallow recess is so shaped and arranged that the hose end is fluid-tightly held on the one nipple end not only by planar pressure but also along at least two annular circumferential lines defined by the sharp edges under linear pressure when the diameter of the coil spring is reduced.

The formation of the annular shallow recess with at least two sharp edges takes the following into consideration:

There are hoses, such as conveyance hoses for delivering material to a silo, for example, which practically always have the same wall thickness. When the hose connector of the present invention is used with such hoses, the end position of the toroidal coil spring in relation to the hose end is fixed even though the coil spring is axially displaced. Therefore, a wide shallow recess with sharp edges may be arranged exactly at that position so that the sharp edges will effectively exert a linear pressure. The conditions are different with garden hoses which may have relatively substantial deviations in their wall thickness even with the same inner diameter. With such garden hoses, which usually are also more elastic than the afore-mentioned industrial hoses, the end position of the coil spring, in which it presses against the hose end, is not fixed. This means that the arrangement must be such that in all axial positions of the coil spring at least two sharp edges press against the hose end. This can be accomplished simply and effectively according to one preferred feature of this invention by arranging at least one circumferentially extending annular web in a suitably widened annular shallow recess, the annular web having the same depth as the annular shallow recess and two shoulders with sharp edges extending substantially perpendicularly to the cylindrical surface of the tubular nipple. This produces four sharp edges or six, in case two webs are arranged in the recess.

The indicated range of the depth dimension of the shallow recess takes into account the hardness or elasticity of the hose material, the depth increasing with an increase in the hose material hardness. For most commercially used hoses, which tend to have the same elasticity, a depth of about 0.5 mm will provide the desired fluid-tightness.

This special shape of the annular shallow recess is essential for the hose connector of this invention. On the one hand, the width of the recess takes into account the axial displacement of the coil spring and, on the other hand, the sharp edges provide the linear pressure on the hose end which has proven to be necessary for the required fluid-tightness, particularly under high pressures in the hose. Thus, the shallow recess fulfills a double function: it holds the hose end on the one nipple end against being pulled off under pressure and it provides the required fluid-tightness by imparting planar pressure interrupted by the linear pressures exerted by the sharp edges. Experience has shown that these sharp edges nevertheless do not cut into the inner wall of the hose, which could seriously damage or even destroy the hose. As the sleeve is screwed into the collar, the axial displacement of the coil spring along the diverging internal wall portion of the collar reduces the diameter of the coil in a radial direction and thus will gently press the hose against the sharp edges as the sleeve, which do not project beyond the circumferential surface of the nipple end. Since the recess with its cylindrical bottom is quite shallow, the hose end is only elastically deformed as it is applied to the cylindrical surface of the nipple end over the sharp edges and the cylindrical recess bottom.

The one nipple end may be inserted, for example screwed into, the collar. Thus, without changing the collar or sleeve, hose connectors of the same overall dimensions and appearance may be manufactured and sold in a very cost-effective manner for use with hoses of different elasticity or hardness simply by providing nipples having different shallow recesses meeting the above-described requirements.

In contrast to known hose connectors using coil springs, the toroidal coil spring in the hose connector of the present invention is not simply radially pressed against the hose end but is progressively radially pressed against the hose end as it is axially displaced. Since the internal frusto-conical collar wall portion diverges towards the sleeve which is screwed into the collar, i.e. opposite to the direction in which the hose end is pulled over the one nipple end, the hose end may be pulled out of the hose connector without difficulty, if required, since the coil spring in the frusto-conical chamber will be relaxed when the sleeve is screwed out of the collar, instead of being wedged against the hose end, as is the case in the known hose connectors with frusto-conical chambers holding a coil spring.

BRIEF DESCRIPTION OF THE DRAWING

The above and other objects, advantages and features of this invention will become more apparent from the following detailed description of certain now preferred embodiments thereof, taken in conjunction with the accompanying drawing wherein

FIGS. 6A, 6B and 6C are greatly enlarged fragmentary views illustrating the shallow recess and coil spring in cooperation;

DETAILED DESCRIPTION OF THE PREFERRED EMBODIMENTS

Figure 1:
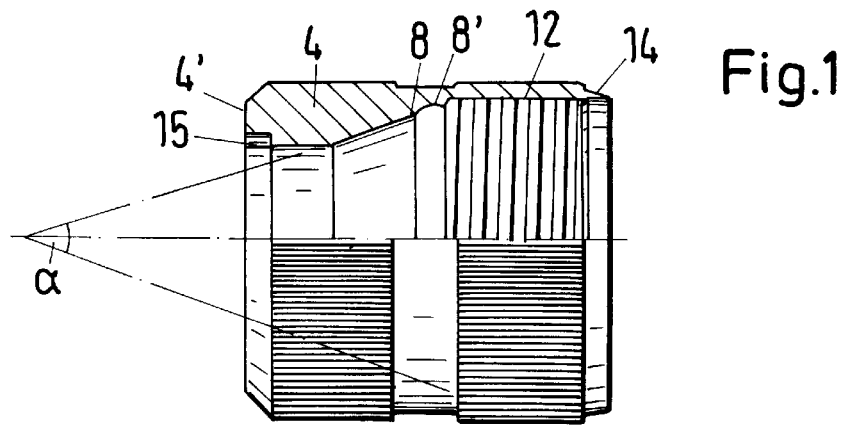
FIG. 1 is a half side elevational and half sectional view taken through the axis of the collar of the hose connector of the invention.
Figure 2:
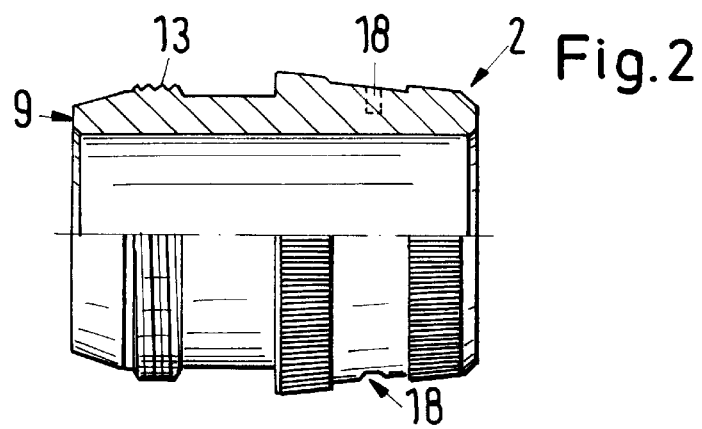
FIG. 2 is a half side elevational and half sectional view taken through the axis of the sleeve of the hose connector of the invention.
Figure 3:
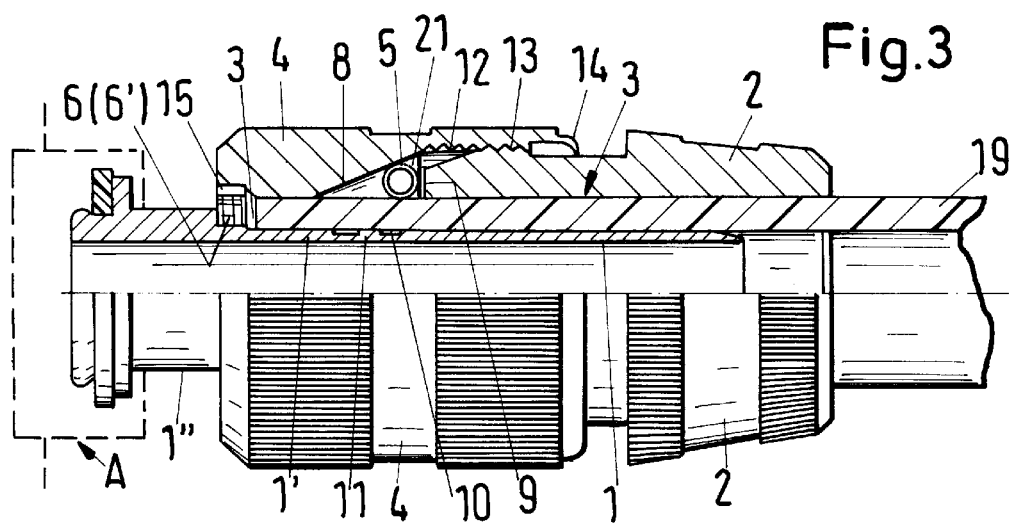
FIG. 3 is a half side elevational and half sectional view taken through the axis of the assembled hose connector comprising the nipple, the collar and the sleeve.

Referring now to the drawing and first to FIGS. 1 to 3, there is shown one embodiment of a hose connector according to the invention. The hose connector comprises tubular nipple 1 having cylindrical surface M (see FIG. 4) and comprising one end 1' insertable into an end of hose 19. The one nipple end defines circumferentially extending, annular shallow recess 10 of a depth of 0.2 mm to 0.8 mm, preferably about 0.5 mm. Shallow recess 10 is delimited by a flat circumferential bottom and two shoulders defining sharp edges 10' and extending substantially perpendicularly to the cylindrical surface of tubular nipple 1 whereby a linear pressure is exerted upon hose 19 whereinto the one tubular nipple end 1' is inserted. Opposite nipple end 1" forms a connecting part, which comprises circumferentially extending screw thread 20 to enable the hose connector holding hose 19 to be attached to an internally threaded socket.

Figure 7:
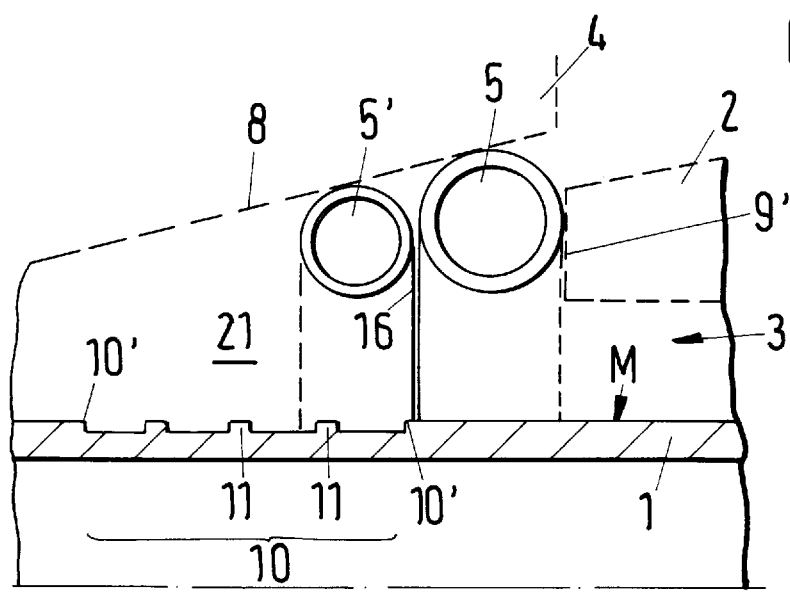
FIG. 7 is a schematic fragmentary view showing another embodiment of the pressure zone and of the annular abutment.

Collar 4 concentrically surrounds the one tubular nipple end 1' and has an internal wall facing the one tubular nipple end, opposite tubular nipple end 1" projecting beyond collar 4. Sleeve 2 concentrically surrounds the one tubular nipple end 1' and is threadedly connected to collar 4 by mating screw threads 12 and 13 on collar 4 and sleeve 2, respectively. Collar 4 and sleeve 2 define annular groove 3 with the circumferential surface of tubular nipple end 1' for receiving the hose end. A portion 8 of the internal collar wall frusto-conically diverges towards sleeve 2, and an end of the sleeve facing frusto-conically diverging internal collar wall portion 8 forms abutment 9. Conically diverging internal collar wall portion 8 and annular abutment 9 define annular chamber 21. As shown in FIG. 3, for example, annular abutment 9 may extend substantially perpendicularly to the cylindrical surface of tubular nipple 1 but it may also extend perpendicularly to frusto-conically diverging portion 8 of the internal collar wall, as shown in FIG. 7.

Figure 3A:
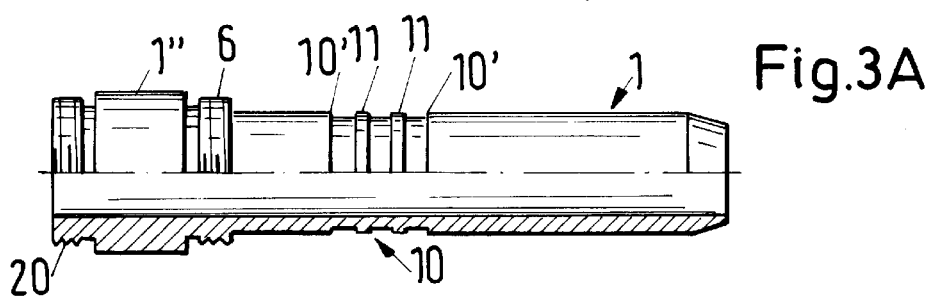
FIG. 3A is a side elevational view, partly in section, of another embodiment of the nipple.

Hose connectors are mass-produced articles and it is important for them to be manufactured in a cost-effective manner while maintaining all advantages of such connectors. For this purpose, it is advantageous to make nipple 1 as a part separate from collar 4 and to provide screw thread 6 on the nipple to mate with internal screw thread 6' on collar 4 so that these parts can be screwed together (FIGS. 3 and 3A). In this way, the end of hose 19 can be mounted on the nipple without requiring any rotary motion of the parts, which could lead to a loosening on screw connection 6, 6'. Before nipple 1 and collar 4 are screwed together, it may be desirable to provide screw threads 6 and 6' with commercially available adhesives. As indicated in broken lines in FIG. 3, it is also possible to mount a connecting adapter A on the projecting end 1" of nipple 1. As shown in FIG. 3A, nipple end 1" may have external screw thread 20, which makes it possible to connect all types of internally screwthreaded parts to the nipple.

Figure 4:
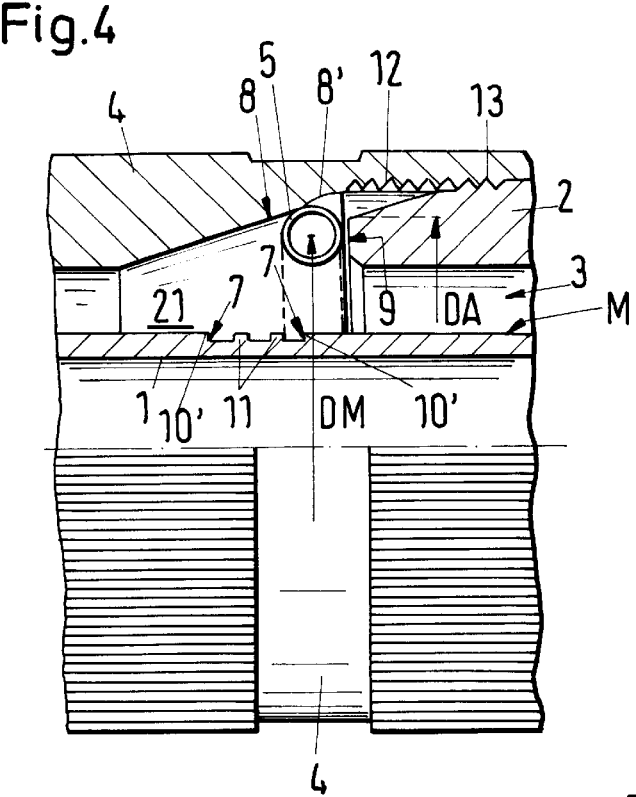
FIG. 4 is a greatly enlarged fragmentary view of the pressure zone of an assembled hose connector, similar to the view of FIG. 3.

As shown in FIGS. 1 and 4, an outer end of frustoconically diverging internal collar wall portion 8 facing sleeve 2 may define an annular concave channel 8' configurated to conform to the contour of toroidal coil spring 5 arranged in annular chamber 21 opposite annular shallow recess 10. The arrangement of such a concave channel has the advantage of defining a "zero" position for coil spring 5 so that it is securely seated in annular chamber 21 and is not displaced when the end of hose 19 is inserted in annular groove 3. As shown in FIG. 4, annular abutment 9 has an outer diameter DA that is slightly larger than a median diameter DM of coil spring 5 in a radially tensionless state.

Internal screw thread 12 is arranged at the end of frustoconically diverging wall portion 8 of collar 4 to mate with circumferentially extending screw thread 13 of sleeve 2, and the collar has rim 14 extending circumferentially over screw thread 13. When the collar and sleeve are assembled, i.e. the sleeve is screwed into the collar (see FIG. 3), the threads are covered and cannot be seen. The hose end is inserted into annular groove 3 while sleeve 2 and collar 4 are relatively loosely screwed together, i.e. before coil spring 5 exerts a radial pressure on the hose end, and bent-over rim 14 has the advantage that it holds the sleeve and collar together as a unit while enabling the sleeve to be rotated. This arrangement also advantageously secures the coil spring in annular chamber 21 against falling out. As sleeve 2 is screwed further into collar 4, coil spring 5 is compressed, i.e. its diameter is radially reduced (FIG. 5B), so that the axial displacement of the sleeve results in a gradual deformation and pressure on the inserted end of hose 19 against nipple 1 to hold the hose end in annular groove 3 and causing sharp edges 10' to exert a linear pressure on the internal hose wall. To hold the axial displacement path to a minimum length while it has a sufficient length to compress coil spring 5, it has been found to be advantageous to hold angle $\alpha$ (FIG. 1) of frusto-conically diverging wall portion 8 within the range of 40°.

As shown in the drawing, at least one circumferentially extending annular web 11 may be arranged in annular shallow recess 10, the annular web having the same depth as the annular shallow recess and two shoulders with sharp edges 10' extending substantially perpendicularly to the cylindrical surface of tubular nipple 1. In the embodiments shown in FIGS. 3A, 4, 6B and 7, several webs 11 with sharp edges are arranged in annular shallow recess 10. When sleeve 2 is screwed into collar 4, coil spring 5 is radially compressed (FIG. 5B) to exert radial pressure on hose 19, and sharp edges 10' will exert a linear pressure on the hose. As best shown in FIG. 4, frusto-conical internal collar wall portion 8 diverges in a direction opposite the direction in which the hose end is slid onto nipple end 1'.

Figure 5A:
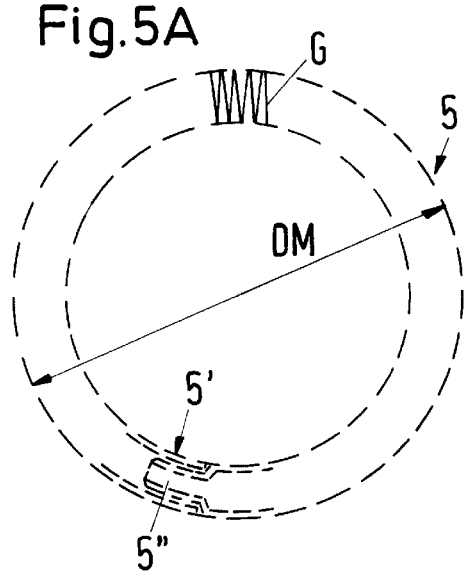
FIGS. 5A and 5B are schematic views respectively showing the coil spring in its untensioned and in its tensioned state.
Figure 5B:
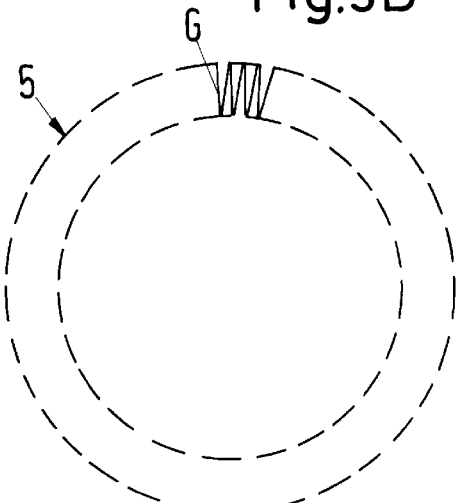

FIGS. 5A and 5B schematically illustrate compression coil spring 5, the coil spring being shown in its relaxed condition in FIG. 5A while it is compressed and its diameter is reduced in FIG. 5B, in which state the pitch of coil spring windings G also is reduced. Preferably and as shown in FIG. 5A, one of the two opposite annular coil spring ends 5" has a reduced diameter and mates with the other end 5' in which it is received, for example by being plugged into the other end. This produces a substantially seamless connection of the two coil spring ends. The toroidal coil spring may be inserted in annular chamber 21 without tension but it may also be pretensioned when it is inserted in the annular chamber.

FIGS. 6A and 6B illustrate the afore-mentioned positioning and dimensioning of shallow annular recess 10 with its sharp edges 10' producing linear pressure between the planar pressure zones produced by circumferential surface M of nipple 1 and the flat circumferential bottom of the shallow annular recess as well as the radial faces of the shoulders and/or webs 11. These dimensions remain unchanged, regardless of the size of the hose connector, i.e. whether used with an 1½" hose or a ½" hose. In other words, the depth of shallow recess 10 remains substantially unchanged and is not increased three-fold, the circumferentially extending flat bottom of the shallow recess delimiting the penetration of the hose wall into the recess so that the inner wall of the hose will not be cut by the sharp edges. If the recess were deeper, i.e. the sharp edges would project farther, the sharp edges would operate like punching dies.

FIG. 6A illustrates the situation in which a given wall thickness of the hose will entail a substantially well defined pressure zone for coil spring 5. Abutment 9 of sleeve 2 applies horizontal pressure component $K_1$ to coil spring 5 to press the same against frusto-conical internal wall portion 8 of collar 4, which generates pressure component $K_2$ extending perpendicularly to wall portion 8 and encloses angle $\beta$ with vertical V. One of the sharp edges 10' must be positioned at the point of intersection of pressure component $K_2$ and circumferential surface M of nipple 1. The other sharp edge 10' is positioned at the point of intersection of pressure component $K'_2$ also enclosing an angle $\beta$ with vertical V at the opposite side of the vertical and the nipple surface.

FIG. 6B, on the other hand, illustrates the situation in which the pressure zone is not predetermined by the nature of the hose material, different wall thicknesses of the hose being designated WS, WS' and WS" and the different axial positions of coil spring 5 corresponding to the different wall thicknesses being shown in full and broken lines, respectively. The axially extending pressure zone in this embodiment must accommodate the extreme end positions and all intermediate positions, and sharp edges 10' must be so arranged that two sharp edges are always effective, as in the embodiment of FIG. 6A. In other words, the width of shallow annular recess 10 is determined by the points of intersection of pressure components $K_2$ and $K"_2$ with nipple surface M. To accommodate the different axial positions, one or two webs 11 are arranged in the shallow annular recess to provide two or four additional sharp edges, only two of these sharp edges being effective at any one time to provide linear pressures between the planar pressure zones.

Greatly enlarged FIG. 6C illustrates the pressure conditions under which hose 19 engages sharp edge 10', the actual measurements being of the magnitude of tenths of millimeters. As schematically shown, axially extending planar pressure F' and radially extending pressure F along shoulder 7 is interrupted by the annularly extending linear pressure caused by sharp edge 10'. The pressure conditions are such as to assure a fluid-tight disposition of the end of hose 19 on nipple 1.

By way of example, a nipple for a ¾" hose may advantageously have a shallow recess 10 of a width of about 6.5 mm and a depth of about 0.4 mm, with two annular webs 11 having a width of about 1 mm (FIG. 6B). With this dimensioning, pressures up to 40 bar may be sustained. The annular webs have the same outer diameter as the cylindrical surface of nipple 1, which is necessary to allow the end of the hose to be pushed over the nipple, and to be pulled off it, without hindrance, on the one hand, and to prevent projecting edges of the annular webs from damaging the inner wall of hose 19, on the other hand.

As shown in FIG. 7, to enable the connector securely to sustain pressures above 40 bar, it is preferred to arrange two toroidal coil springs 5, 5' in annular chamber 21 opposite annular shallow recess 10, one of the coil springs 5' having a smaller diameter than the other coil spring 5. The two coil springs are separated by ring 16. FIG. 7 also shows the embodiment wherein annular abutment 9' extends substantially perpendicularly to frusto-conically diverging wall portion 8, instead of radially, as illustrated in the other figures. This will cause the annular abutment to exert a downwardly oriented pressure component on coil spring 5, instead of horizontally oriented pressure component $K_1$ shown in FIG. 6A.

According to another preferred feature, end face 4' of collar 4 facing away from sleeve 2 defines a pressure relief vent 15 communicating with annular chamber 21. When a high pressure suddenly surges inside hose 19, the hose end inserted in annular groove 3 expands in the direction of the pressure surge and progressively presses against the inner wall of sleeve 2 until it reaches coil spring 5. This results in a compression of the air in annular chamber 21, which could lead to the disconnection of the hose from the connector under unfavorable conditions. Any such damage is avoided by relieving any excess pressure through vent 15.

Figure 8:
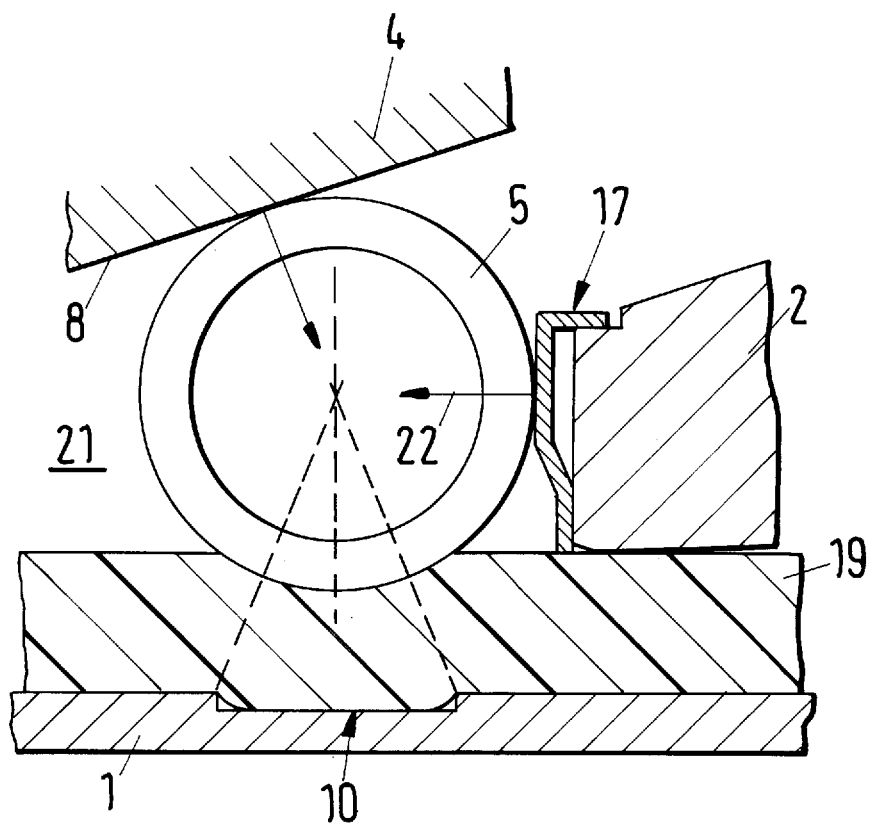
FIG. 8 is a further schematic fragmentary view illustrating yet another embodiment of the pressure zone.

FIG. 8 shows an embodiment in which an annular spring element 17 is arranged between the annular abutment of sleeve 2 and toroidal coil spring 5. The illustrated annular spring element is a disk spring having a rim engaging a shoulder at the end of sleeve 2. As shown by arrow 22, this disk spring exerts an axially directed bias on coil spring 5 and thus provides an added safety element. For instance, if ambient circumstances, such as heat, cause the elasticity of the hose to be changed, this may result in a lessening of the pressure of coil spring 5 on the hose. Since spring element 17 is stressed at the same time as coil spring 5 when collar 4 and sleeve 2 are screwed together, it will automatically enhance the pressure of the coil spring under such circumstances.

As shown in FIG. 6B, the end of sleeve 2 forming annular abutment 9 may be a ring 9" rotatably mounted on the sleeve. This facilitates the screwing of sleeve 2 into collar 4 as the annular abutment presses against coil spring 5.

Finally, as shown in FIG. 2, sleeve 2 may have a recess 18, such as a bore or slot, for engagement by auxiliary means (not shown) for rotating the sleeve.

What is claimed is:

1. A hose connector comprising, in combination:
  (a) a tubular nipple having a cylindrical surface and comprising
    (1) one end insertable into an end of a hose, the one end defining a circumferentially extending, annular shallow recess of a depth of 0.2 mm to 0.8 mm, the shallow recess being delimited by a flat bottom and two shoulders defining sharp edges and extending perpendicularly to the cylindrical surface of the tubular nipple whereby a linear pressure is exerted upon a hose whereinto the one tubular nipple end is inserted, and
    (2) an opposite end forming a connecting part,
  (b) a collar concentrically surrounding the one tubular nipple end and having an internal wall facing the one tubular nipple end,
    (1) the opposite tubular nipple end projecting beyond the collar,
  (c) a sleeve concentrically surrounding the one tubular nipple end and threadedly connected to the collar,
    (1) the collar and the sleeve defining an annular groove with the circumferential surface of the tubular nipple end for receiving the hose end,
    (2) a portion of the internal collar wall frusto-conically diverging towards the sleeve, and
    (3) an end of the sleeve facing the frusto-conically diverging internal collar wall portion forming an annular abutment,
    (4) the conically diverging internal collar wall portion and the annular abutment defining an annular chamber, and
  (d) at least one toroidal coil spring arranged in the annular chamber opposite the annular shallow recess,
    (1) the annular abutment having an outer diameter that is slightly larger than a median diameter of the coil spring in a radially tensionless state.

2. The hose connector of claim 1, wherein the annular abutment extends substantially perpendicularly to the cylindrical surface of the tubular nipple.

3. The hose connector of claim 1, wherein the annular abutment extends substantially perpendicularly to the frusto-conically diverging internal collar wall portion.

4. The hose connector of claim 1, comprising at least one circumferentially extending annular web arranged in the annular shallow recess, the annular web having the same depth as the annular shallow recess and two shoulders with sharp edges extending substantially perpendicularly to the cylindrical surface of the tubular nipple.

5. The hose connector of claim 1, wherein an end of the frusto-conically diverging internal collar wall portion facing the sleeve defines an annular concave channel.

6. The hose connector of claim 1, wherein the coil spring has two opposite ends, one of the coil spring ends having a reduced diameter and being received in the opposite end to form a torus.

7. The hose connector of claim 6, wherein the one coil spring end is plugged into the opposite end.

8. The hose connector of claim 1, wherein two of said toroidal coil springs are arranged in the annular chamber opposite the annular shallow recess, one of the coil springs having a smaller diameter than the other coil spring.

9. The hose connector of claim 1, wherein an end face of the collar facing away from the sleeve defines a pressure relief vent communicating with the annular chamber.

10. The hose connector of claim 1, wherein the sleeve has a circumferentially extending screw thread and the collar has a rim circumferentially extending over the screw thread.

11. The hose connector of claim 1, further comprising an annular spring element arranged between the abutment of the sleeve and the toroidal coil spring.

12. The hose connector of claim 10, wherein the spring element is a disk spring.

13. The hose connector of claim 1, wherein the end of the sleeve forming the annular abutment is a ring rotatably mounted on the sleeve.

14. The hose connector of claim 1, wherein the sleeve has a recess for engagement by auxiliary means for rotating the sleeve.

* * * * *